United States Patent [19]
Wilson

[11] 3,733,517
[45] May 15, 1973

[54] ELECTRICAL APPARATUS WITH GROUND FAULT DETECTOR AND INSTANTANEOUS TRIP CIRCUIT

[75] Inventor: John T. Wilson, Beaver, Pa.

[73] Assignee: Westinghouse Electric Corporation, Pittsburgh, Pa.

[22] Filed: Aug. 30, 1971

[21] Appl. No.: 176,114

[52] U.S. Cl. ............ 317/18 D, 317/27 R, 317/36 TD
[51] Int. Cl. ............................................. H02h 3/30
[58] Field of Search .................... 317/36 TD, 18 D, 317/142, 27 R; 307/294, 141 R

[56] References Cited
UNITED STATES PATENTS 3,539,866 11/1970 Stevenson ........................ 317/18 D
3,555,359 1/1971 Morris .............................. 317/18 D
3,619,723 11/1971 Walden ............................... 317/38
3,496,417 2/1970 Tenenbaum ...................... 317/36 TD

*Primary Examiner*—William M. Shoop, Jr.
*Assistant Examiner*—Harvey Fendelman
*Attorney*—A. T. Stratton et al.

[57] ABSTRACT

A ground fault sensor circuit adapted to be actuated to override a preset time delay for the actuation of a circuit interrupter in such a manner that a protective circuit breaker may be caused to open almost instantaneously in response to the sensing of a ground fault current rather than after a time delay.

5 Claims, 3 Drawing Figures

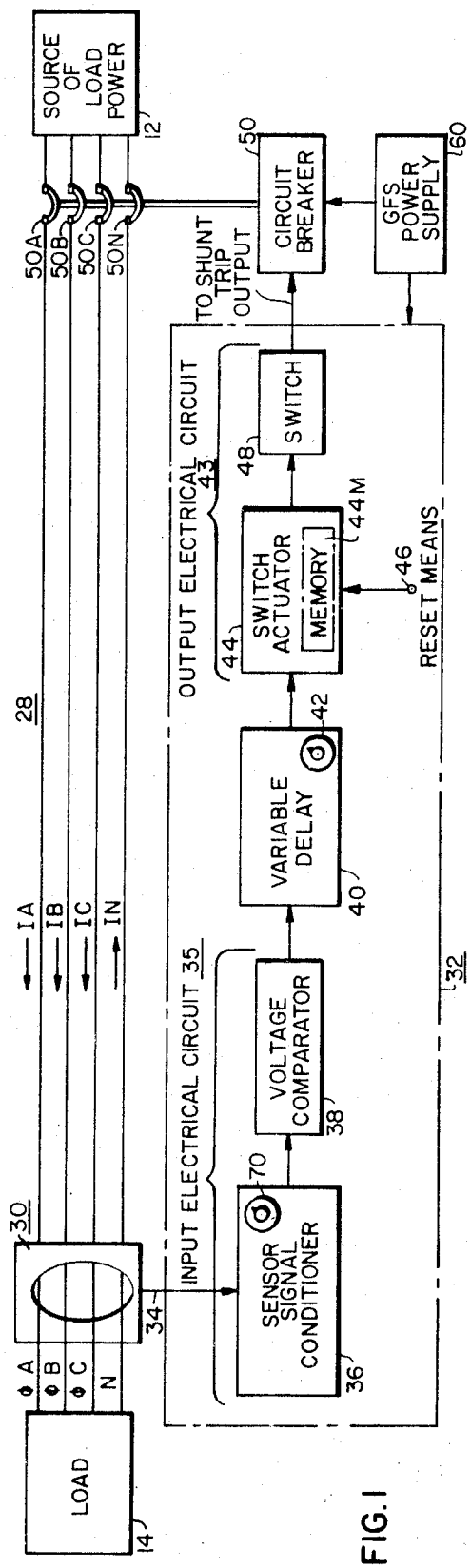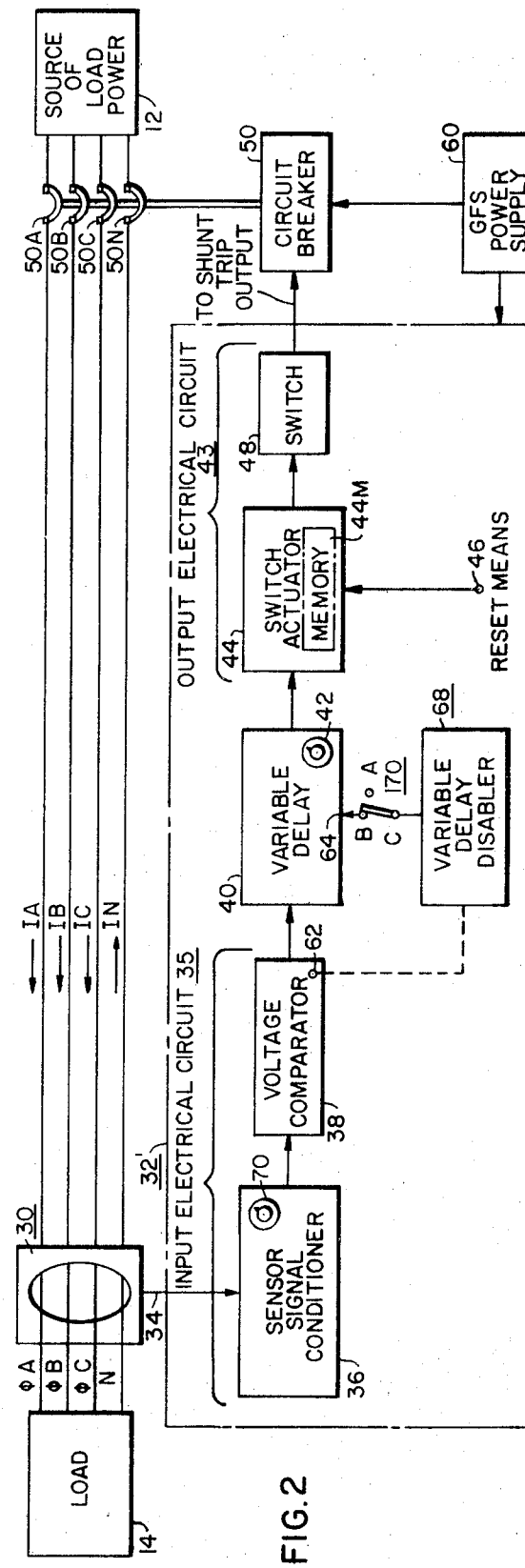

ELECTRICAL APPARATUS WITH GROUND FAULT DETECTOR AND INSTANTANEOUS TRIP CIRCUIT

CROSS REFERENCES TO RELATED APPLICATIONS

Certain inventions related to those disclosed in the present invention are disclosed and claimed in copending application Ser. No. 175,880 filed concurrently by G. Watson and M. B. Brennan and Ser. No. 176,115 filed concurrently by J. T. Wilson which are both assigned to the same assignee as the assignee of the present application.

BACKGROUND OF THE INVENTION

This invention relates to ground fault sensor or detector circuits and it has particular relation to ground fault detector circuits which include variable time delay features and which are adapted to be converted to a substantially instantaneously acting ground fault detector.

Known types of ground fault sensors or ground fault detector circuits are provided with a means for adjusting the timing out or period of delay of the ground fault detector circuit, such that the tripping of an associated circuit breaker after the sensing of a ground fault may be varied between a relatively short and a relatively long time period. However, because of certain intrinsic capacitive and resistive limits in components used in known time delay circuits, it is difficult in such known circuits to actuate an almost instantaneous tripping of the associated protective circuit breaker while retaining the capability of selecting a predetermined time delay before actuating a tripping operation.

SUMMARY OF THE INVENTION

In accordance with the present invention, a ground fault sensor circuit includes a transistor and switching means, in order that the normal time delay provided in the operation of the ground fault sensor or ground fault detector circuit may be overriden or eliminated by the actuation of the switch to a predetermined position. In such a case, the ground fault detector circuit will actuate a tripping operation in the associated protective circuit breaker almost instantaneously in response to the sensing of a predetermined ground fault current in the circuit to be protected.

BRIEF DESCRIPTION OF THE DRAWINGS

For a better understanding of the invention, reference may be had to the preferred embodiment exemplary of the invention shown in the accompanying drawings, in which:

FIG. 1 is a functional block diagram of the ground fault detector or ground fault sensor circuit as used in conjunction with an electrical transmission system, a current monitor and a circuit breaker;

FIG. 2 shows a functional block diagram of a ground fault sensor similar to the one shown in FIG. 1 but with the addition of a variable delay disabler functional block;

DESCRIPTION OF THE PREFERRED EMBODIMENTS

Figure 3:
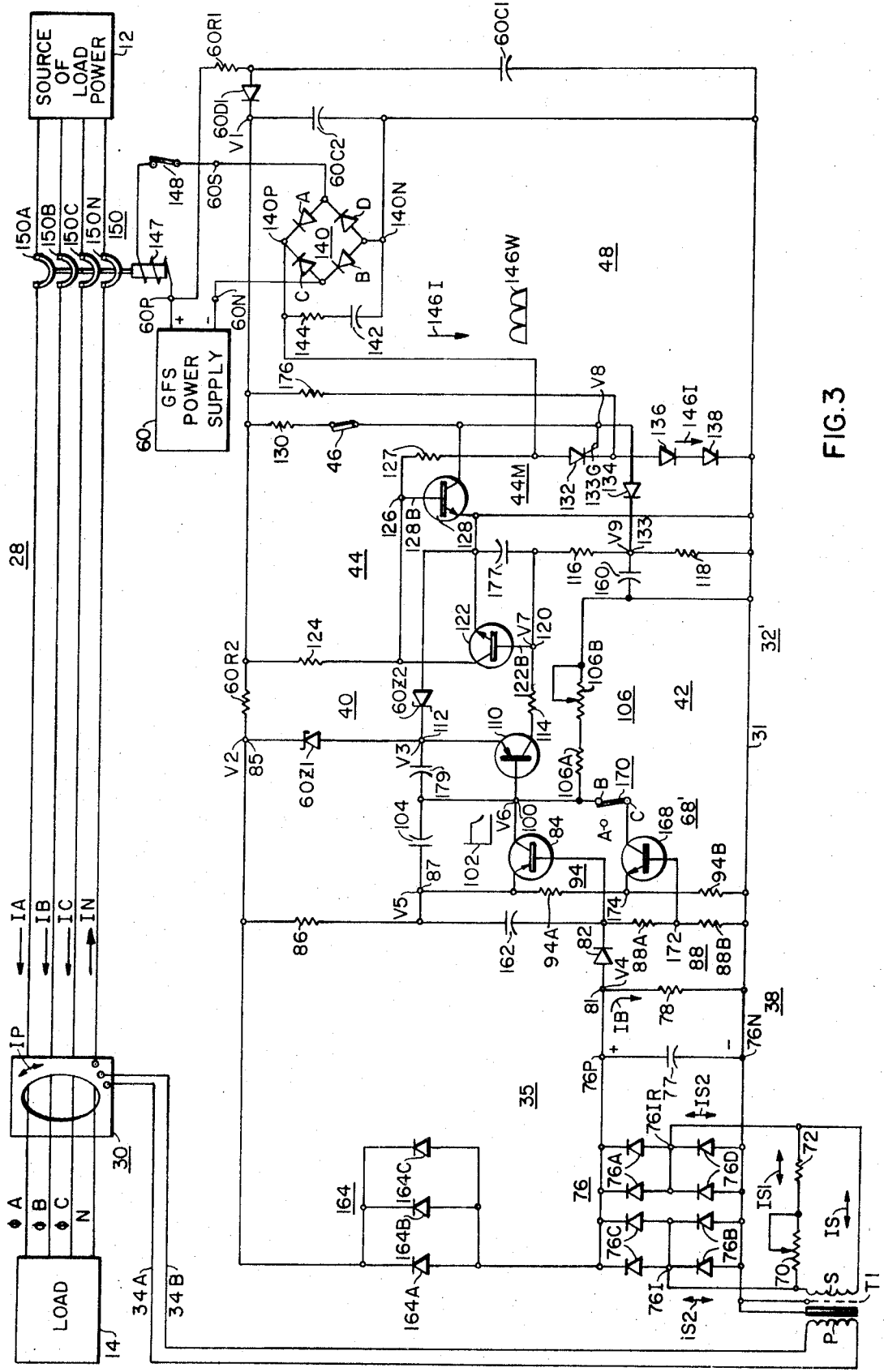
FIG. 3 is a circuit diagram of the ground fault sensor circuit shown in FIG. 2.

Referring now to the drawings and FIG. 1 in particular, a ground fault detector system 28 comprising a source of electrical power 12 and an electrical load 14, similar to the ground fault detector or sensor disclosed and described in copending application Ser. No. 175,880 is shown. Phase currents IA, IB, IC flow in phases $\phi A$, $\phi B$ and $\phi C$, respectively, and return current or neutral current IN flows in neutral wire N. A current monitor or current transformer 30 completely encircles all of the transmission conductors or lines, namely $\phi A$, $\phi B$, $\phi C$ and N which are disposed between the source of power 12 and the load 14. A circuit breaker 50 is provided having contacts 50A, 50B, 50C and 50N protecting or connected in the lines or transmission leads $\phi A$, $\phi B$, $\phi C$ and N, respectively. The source of power 12 and the load 14 may be connected or arranged in a wye configuration, but are not necessarily limited to that type of three-phase electrical configuration.

Circuit breaker 50 is controlled by a ground fault sensor circuit 32. Ground fault sensor 32 has an input terminal or lead 34 at which energy or an output electrical current from current sensor or transformer or monitor 30 may be provided to the ground fault sensor 32. Ground fault sensor 32 also is provided with source of sensor power 60 which may be any standard source of electrical power, such as is commonly found in commercial usage. Ground fault sensor 32 comprises three functional sections, namely an input electrical circuit 35, a variable time delay circuit or variable delay 40 and an output electrical circuit 43. Electrical current from the current monitor 30 is applied to terminal or line 34 of the ground fault sensor 32 whereupon it is conditioned by the input electrical circuit 35 so that a signal may be applied to the variable delay means 40. The energy from the variable delay means is provided to the output electrical circuit 43 from whence it may be applied to actuate circuit interrupter or breaker 50.

Input electrical circuit 35 may include a sensor signal conditioner 36 with an electrical sensitivity control 70 and a sequentially connected voltage comparator 38. Output electrical circuit 43 may include a switch actuator circuit 44 which in turn may include a memory means 44m. Switch actuator 44 provides energy to a switch or switching means 48.

To sum up, ground fault sensor circuit 32 may comprise five separate functional portions which include sensor signal conditioner 36 which receives energy from current monitor 30, a voltage comparator 38 which receives energy or a signal from sensor signal conditioner 36, a variable time delay 40 having a variable time delay control 42 and which receives information or electrical signals from voltage comparator 38, a switch actuator 44 which may have a memory means 44m, which receives electrical signals from the variable delay 40, and a switch 48 which receives energizing information or actuating signals from switch actuator 44. Switch actuator circuit 44 has a reset capacity or reset means as indicated at 46.

In actual operation, if a ground fault current is detected in electrical system 28, current monitor 30 will be energized to produce an output electrical current at terminal or input line 34 of the ground fault sensor 32. The sensor signal conditioner 36 will then convert that signal to a voltage, the value of which is dependent upon the adjustment of the sensitivity control 70. The latter voltage will then be applied to voltage comparator 38 and if the applied voltage attains or changes to a predetermined value, an output signal will be provided to the variable time delay circuit 40. Variable time delay circuit 40 will commence to provide a time delayed signal at a fixed or predetermined time, as determined by the adjustment of the time delay control 42. This signal will be applied to the switch actuator circuit 44 which will, in turn, supply energizing power to actuate switch 48 which will then supply energy to the shunt trip coil (not shown) of circuit breaker 50 causing the circuit breaker 50 to actuate each of the circuit breaker contacts 50A, 50B, 50C and 50N to the open position to remove the fault from system 28.

In the event that the ground fault disappears or is corrected within a time preset with the time delay control 42, no energizing signal will be provided to the switch actuator 44 and, consequently, circuit breaker 50 will not be actuated to an open position. In addition, when switch actuator 44 includes a memory means 44m, once the actuator 44 has been actuated, to provide a signal to open circuit breaker 50 an indication of the recent presence of the last-mentioned signal may be provided even after that signal ceases.

Referring now to FIG. 2, it will be noted that ground fault sensor 32 may have a variable delay disabler or disabling means 68 which may be connected electrically through a connecting means or switching means or switch 170 to the variable delay circuit 40. Disabler circuit 68 is connected at its other end to the voltage comparator circuit 38 by way of terminal 62. When switch means 170 is closed, or actuated to the B position, the output of the variable delay disabler 68 is connected to an input terminal 64 of the variable delay or variable time delay means 40. The input or energizing signal from the variable delay disabler 68 is derived from the input electrical circuit 35 or, more specifically, from an output terminal 62 on the voltage comparator circuit 38. When the variable delay disabler 68 is connected to terminal 64 of the variable delay 40 through switching means 170, the sensing of a predetermined amount or value of zero sequence phase or ground fault current by current monitor or sensor 30 will actuate a substantially instantaneous opening of circuit breaker 50 even though the time delay control or time adjustment means 42 of the variable delay 40 has been adjusted to provide a substantial time delay before the tripping of circuit breaker 50. Consequently, the variable delay disabler 68 may be thought of as having the capability of being adjusted to override the time delay control 42 of the variable delay or variable time delay means 40.

Referring now to FIG. 3, an electrical circuit or system which may represent, in detail, a schematic diagram of ground fault sensor 32 is shown. The transmission system 28 including the source of power 12 and load circuit 14 are also indicated in FIG. 3. Phase currents IA, IB, IC are shown flowing in phases $\phi A$, $\phi B$, $\phi C$, respectively, and neutral current IN is shown flowing in neutral wire N. In addition, circuit breaker contacts 50A, 50B, 50C and 50N are adapted to be actuated to the open positions to isolate load circuit 14 from source of power 12. In the event that a ground fault current is sensed by current monitor or loop current transformer 30, an induced primary alternating current IP flows into the primary winding terminals or wires 34B and 34A of the primary winding P of isolation transformer T1. Consequently, a secondary current IS flows in the secondary winding S of transformer T1. Current IS is divided into two components which include current component IS1 which flows through resistors 72 and 70, which are serially connected across the secondary winding S of transformer T1. Resistor or potentiometer 70 is adjustable or variable to provide a lower or higher resistive load for current IS so that the component of current, TS1, flowing through resistors 70 and 72 may be made relatively larger or smaller for a particular value of ground fault current sensed by the current monitor 30. The adjustable resistor or rheostat 70 may be known as a sensitivity control means. The second component of current IS is current IS2 which flows into a rectifier bridge 76 through input terminals 76 IL and 76IR and may be made relatively larger or smaller in magnitude for the same magnitude of primary current IP by varying the resistance means 70. The direct result of this circuit arrangement is to provide a component of output current, IB, which flows from positive output terminal 76P of bridge 76 to negative output terminal 76N of bridge circuit 76. Current IB flowing through resistor 78 produces or develops a sufficient magnitude of unidirectional current voltage V4 at point or junction 81 to actuate other portions of the ground fault sensor 32'.

The magnitude of voltage V4 produced or developed by the current IB flowing through resistor 78 is regulated by filter capacitor 77 and may be typically be of such a value that a ground fault current having a magnitude of five amperes for example may produce a value of current IP in the current monitor 30 which is sufficient to develop a value of voltage V4 at junction 81 which may cause the ground fault sensor 32' to actuate circuit breaker or circuit interrupter 50.

When voltage V4 reaches a value which is sufficient to forward bias isolating diode 82, the normally conducting or turned-on transistor 84 will be turned off. Transistor 84 may be of the PNP type and have resistance means or resistor 86 connected to its emitter. The other end of resistor 86 may be connected to a source of voltage V2 which may be supplied by a separate ground fault sensor (GFS) power source of unidirectional or direct current voltage 60. Voltage V2 may for example be a highly regulated direct current voltage having a value of 15 volts. Also connected to the emitter of transistor 84 is a resistive means or component 94 which may comprise a single resistive element or a pair of resistors or resistive elements 94A and 94B connected in series circuit relationship with one another. Connected to the base of the transistor 84 is the cathode of the previously mentioned isolating diode 82 and a base drive resistor or resistance means 88 which may comprise a pair of resistors 88A and 88B connected in series circuit relationship with one another.

Variable delay disabler 68' includes an NPN transistor 168 and a switch 170. The junction 172 between resistance means 88A and resistance means 88B is connected to the base of transistor 168. The junction 174 between resistors 94A and 94B is connected to the emitter of transistor 168. The collector of transistor 168 is connected to one end or terminal C of the pole or movable member of switch 170. Terminal B of switch 170 may be connected to one end of the combination timing and reset capacitor 104 and the collector of transistor 84. It will be noted that switch 170 has an additional contact point A such that the pole of the movable electrically conducting service switch 170 may be aligned to provide electrical contact between terminal C and terminal B or alternately between terminal C and terminal A. Connected between the emitter and collector of transistor 84 is a multi-purpose timing capacitor 104. The multi-purpose timing capacitor may comprise a combination reset and timing means. Normally, electrical current flows from junction 85 through emitter resistor 86 and the resistor 94 (or resistors 94A and 94B), and back to common line 31. This current establishes a voltage V5 at junction 87 or at the emitter of transistor 84 which may be approximately 12 volts and which is positive with respect to the voltage at the common conductor or bus 31. The voltage V5 is sufficient to normally forward bias transistor 84 and cause current to flow into the base-drive resistor 88. Considering the voltage V4 at the anode of the diode 82 as long as voltage V4 is insufficient to forward bias diode 82 and, consequently turn off or actuate transistor 84 to a substantially non-conducting condition, then a virtual short circuit will be effective across the timing or reset capacitor 104 to prevent the charging thereof. The other end of capacitor 104 or junction point 100 is connected to terminal 76N of bridge circuit 76 through a resistor or resistive element 106 where the value of resistor 106B may be variable. Normally current flows from the collector of transistor 84 to resistance means 106. When electrical current flows through resistor 106 (or the pair of resistors 106A and 106B) then the voltage V6 at junction point 100 is substantially equal to voltage V5 the difference being the emitter-to-collector voltage drop across transistor 84. But when transistor 84 is turned-off or actuated to a substantially non-conducting condition, then current flow to the resistive means 106 from the collector of transistor 84 is negligible and voltage V6 changes. But voltage V6 is constrained not to change instantaneously because of the time required for capacitor 104 to charge. The R-C time constant for charging capacitor 104 is determined by the capacitance of capacitor 104 and the resistance of resistors 86, 106A and 106B and may be varied by changing the value of resistor 106B which is adjustable or variable. As capacitor 104 charges, voltage V6 at junction point 100 approaches the voltage value of the bus or common conductor 31.

If V4 subsequently decreases to a value which results in forward biasing transistor 84 once again, then capacitor 104 discharges or resets through the collector to emitter circuit of a conducting transistor 84.

Junction point 100 is also connected to the base of a second transistor 110. Transistor 110 is normally off or substantially non-conducting when voltage V6 is higher than the voltage V3 at the junction 112 or emitter of the PNP transistor 110. However, as the value of voltage V6 approaches the value of the voltage at the common conductor 31, transistor 110 is turned on or actuated to a saturated condition and current may flow from the voltage source indicated at V3 through the emitter-to-collector circuit of transistor 110 and resistors 114, 116 and 118, to the common terminal or line 31. Voltage V3 may for example be a direct current voltage of approximately 6.8 volts which is positive with respect to the voltage at the terminal 76N or common line 31. As current flows through the resistors 114, 116, 118, voltage values are established or result at junction points 120 and 133 which are indicated as voltages V7 and V9, respectively.

Junction point 120 is connected to the base 122B of a third transistor 122 which is normally in an off or substantially non-conducting state because voltage V7 at base 122B is very low or near the voltage value of line 31 relative to the voltage V1. Consequently, current from voltage source V1 may flow through resistor 124 into the base 128B of the normally "on" or saturated transistor 128 and through the base-to-emitter circuit of transistor 128 to the common conductor 31. This base drive current normally forward biases or maintains transistor 128 in a conducting state. However, should the value of voltage V7 rise, such as the case when transistor 110 is turned on, the collector-to-emitter circuit of transistor 122 is actuated to a conducting state. Consequently some of the current which had previously been flowing into the base 128B of transistor 128 is shunted through or transferred to the collector-to-emitter circuit of the conducting transistor 122. As a result, transistor 128 ceases to conduct or is actuated to a substantially non-conducting condition because of the loss of base drive current. When transistor 128 ceases to conduct, current flowing from voltage source V1 through resistor 130, the closed switch 46 and the collector-to-emitter circuit of transistor 128 to common line 31 ceases to flow or decreases to a negligible value. The voltage V8 at gate terminal 133G of gating means or switch 132 then increases in value because the voltage drop across the resistor 130 due to current flowing through resistor 130 substantially decreases. An increase in voltage V8 causes silicon controlled rectifier (SCR) or gated static switch 132 to conduct electrical current from its anode to its cathode and through diodes 136 and 138 to the common line 31 or negative terminal 76N of bridge circuit 76. This current flows into the last-mentioned anode of the silicon controlled rectifier (SCR) 132 from voltage source V1 through resistor 124 and resistor 127 which are connected in series with the anode of the SCR 132. The anode of the silicon controlled rectifier 132 is connected, along with the diodes 136 and 138, across the output terminals, 140P and 140N, of an input power supply bridge circuit 140. The actuating or turning on of silicon controlled rectifier or thyristor 132 in effect completes a circuit or current carrying path between the two output terminals, 140N and 140D of bridge 140 and allows current to flow through certain associated components and the circuit breaker trip coil 147 to energize the trip coil 147. Note that the trip coil 147 and circuit breaker contacts 150A, 150B, 150C and 150N are shown cooperating in a stylized manner for the purpose of simplicity. In actuality the combination may be arranged differently.

Assuming that electrical contact has been made between terminal C and terminal B of switch 170 so as to connect the variable delay disabler 68' to junction point 100, whenever a sufficient amount of voltage V4 at junction 81 is applied to the ground fault detector system 32' to cause transistor 84 to cease to conduct, the timing function provided by capacitor 104 would normally being. But by design a sufficient value of voltage may be concurrently provided at junction 172 through the voltage divider 88 comprising resistor 88A and resistor 88B to overcome the relatively fixed value of voltage present at junction 174 and forward bias transistor 168. consequently the collector-to-emitter path of the transistor 168 will become conducting. Such being the case, the low end of capacitor 104 or junction point 100 is effectively connected to system common 31 or terminal 76N through switch 170, the collector-to-emitter circuit of transistor 168 and the relatively small resistor or resistance means 94B. The value of resistor 94B may be purposely selected to be relatively small compared with the total resistive values provided by the serially connected resistors or resistive elements 106A and 106B of resistive element or resistor 106. Consequently, the low end of capacitor 104 quickly or almost instantaneously changes to the voltage potential present at line 31. The rate of charging of capacitor 104 is relatively fast as to be almost instantaneous. Consequently, transistor 110 is turned on almost instantaneously and the functions or operations which have previously been described and which follow from the turning on of transistor 110 and which culminate in the opening of circuit interrupter 150 occur so rapidly that contacts 150A, 150B, 150C and 150N of circuit breaker 150 are actuated to an open status almost instantaneously after a ground fault current has been sensed by sensing means 30.

In the event that the pole or electrical switching blade of switch 170 is realigned from contact point B to contact point A so that there is no electrical continuity between contact point C and contact point B, circuit 32' will operate as if the variable delay disabler 68' were not present. That is, it will provide a predetermined time delay in its operation for opening circuit breaker 150 in a manner described in detail in copending application Ser. No. 175,880.

The variable resistor 106B used in combination with resistor 106A, resistor 86, and capacitor 104 to form an RC timing circuit may be varied so as to provide time delays in a predetermined range which may extend between the time represented by 5 cycles of 60 hertz alternating electrical current and the time represented by approximately 40 cycles before the transistor 110 is turned on as described in detail in the last-mentioned copending application. However, the actuation of the variable delay disabler through switch 170 may for example reduce the operating or response time to less than the time represented by one cycle of a similar alternating electrical current system.

In order to provide the memory means 44M for circuit 32', the increase in voltage V8 at gate or terminal 133G may be fed or reflected through a forward biased diode 134 to junction point 133. The voltage at junction point 133 increases to a voltage value indicated by V9. This increase in the value of voltage V9 is reflected by means of resistor 116 to junction point 120 causing voltage V7 to increase proportionally. Consequently, the base 122B of transistor 122 is kept forward biased regardless of what happens in the previously mentioned associated preceding stages of the overall circuit 32' until the gate voltage V8 at terminal 133G is once again lowered or decreased by actuating a normally closed reset means 46 which includes means for operatively disconnecting power source V1 from gate 133G. Operation of the latter reset means also causes a reset of the memory means 44m.

In this particular embodiment, current 146I which flows into the anode of the silicon controlled rectifier 132 comprises a full wave rectified current, as illustrated by wave shape or pulse train 146w.

The ground fault sensor power supply 60 may for example provide a sixty hertz, alternating current voltage of a convenient value or amplitude. Power supply 60 as illustrated has a first terminal 60P which may be instantaneously positive as indicated in FIG. 3 and a second terminal 60N which may be instantaneously negative as indicated. It is assumed that initially one-half wave of alternating current may flow from the instantaneously positive terminal 60P through the circuit breaker shunt trip coil 147, through a closed control switch 148 into terminal 60S and to diode 140A of bridge circuit 140. The current will then continue to flow through diode 140A to the positive terminal 140P of the full wave rectifier bridge circuit 140 and through the conducting silicon controlled rectifier 132 and the series connected diodes 136 and 138 to the negative terminal 140N of the bridge circuit 140 and through diode 140B to the other terminal 60N of the power supply 60. When the alternating current from the power supply 60 changes polarity during the next half cycle (not indicated), the voltage at the terminal 60N will be instantaneously positive with respect to the voltage at the terminal 60P and current will flow from terminal 60N through diode 140C to positive terminal 140P of the bridge circuit 140, through silicon controlled rectifier 132, diodes 136 and 138 to the negative terminal 140N and continue through diode 140D of bridge 140 to terminal 60S of the ground fault detector 32'. From terminal 60S, current may flow through closed switch 148 and the circuit breaker shunt trip coil 147 to the other terminal 60P of the ground fault sensor power source 60.

It will be noted that the ground fault detector power source 60 may also supply the power to provide voltages V1, V2 and V3 of the ground fault detector 32' and it also should be noted that it is possible to use any ground fault detector power source 60 which may have a standard output voltage in a range between 40 and 120 volts ("AC or DC") and still actuate the components of ground fault detector 32' as well as energize the shunt trip coil 147. Voltage V1, V2 and V3 which were previously mentioned may be direct or unidirectional current voltages having values of approximately 110 volts, 15 volts and 6.8 volts, respectively. The terminal 60P of power source 60 is also connected to a resistor 60R1 which is connected at its other end to a diode 60D1 and a storage capacitor 60C1. If the power source 60 supplies a direct current voltage, diode 60D1 may be forward biased and capacitor 60C1 charged to near the peak value of voltage present at the terminal 60P of ground fault detector power source 60. This voltage may be, for example, 40 volts (direct) current. If the source 60 supplies alternating current, then only positive fluctuating half cycles will be present at the cathode of diode 60D1. The cathode of diode 60D1 is connected to a second capacitor 60C2 which acts as a combination filter capacitor and energy storage capacitor. It will be noted that voltage V1 may be regulated less efficiently in the case of an alternating current source of power 60. The source 60 is nevertheless effective to provide power through resistor 60R2 to energize Zener diodes 60Z1 and 60Z2 to produce highly regulated values of voltages V2 and V3, at terminals or junctions 85 and 112, respectively.

A capacitor 142 and a resistor 144 are connected in series circuit relationship across or in parallel with the series circuit which includes the silicon controlled rectifier or gated valve 132 and diodes 136 and 138. The capacitor and resistor combination which includes the capacitor 142 and the resistor 144 serves a dual purpose. First, it prevents a spurious anode turn-on or triggering of the silicon controlled rectifier 132 when a high rate of voltage change with respect to time is impressed across the anode-to-cathode circuit of silicon controlled rectifier 132, because the capacitor 142 and resistor 144 suppress the high values of voltage rise with respect to time. Second, since the capacitor 142 and resistor 144 are also connected in series across the output terminals of bridge 140 they act as a filter network for any fluctuating component of current 146I from the output terminals of bridge 140. In addition, capacitors or capacitive elements 162, 179 and 177 act as voltage spike suppression capacitors for transistors 84, 110 and 122 respectively. Capacitor or capacitive element 160 also acts as a voltage spike suppression means.

Bridge circuit 76 comprises parallel diode pairs 76A, 76B, 76C and 76D. These diodes are arranged in parallel pairs to accommodate large values of current in the bridge circuit or full wave bridge rectifier means 76. Parallel diode array 164 associated with the bridge circuit 76 may comprise a plurality of diodes 164A, 164B and 164C arranged in parallel circuit relationship. The respective anodes of each of the named diodes are connected to the positive terminal 76B and of bridge circuit 76 the cathodes are connected to the regulated voltage source V2 at junction point or terminal 85. These diodes provide a high current short circuit path into voltage source V2 should the value of V4 rise to such a high value as to endanger transistor 84 with excessive reverse base-to-emitter voltage. Array 164 therefore may act as a voltage regulation means during certain operating conditions for the positive terminal 76P of bridge 76.

It is to be understood that the current monitor 30 may actually comprise multiple current monitors or a plurality of current monitors, one of each wire in the multi-phase system, the output of which may be summed at a summing point. It is also to be understood that in practice the ground fault detector circuit may sense ground faults in a balanced three-phase system in which the neutral wire designated N is not included within the periphery of the current monitor or transformer 30. In addition, it is to be understood that the source of power and load may be connected in any of the common types of electrical configurations such as a delta (Δ) configuration for both, a Y configuration for both, Δ-Y configuration, respectively and Y-Δ configuration respectively. Multi-phase systems above three phase may also be monitored. It is also to be understood that the circuit interrupter, such as circuit breaker 150, need not necessarily have a separate set of contacts to disconnect the neutral lead as is shown in the drawings. In addition, it is to be understood that the current monitor and associated ground fault detector system may be used or utilized to detect other types of electrical system faults than ground faults. As an example, a fault to a system common member, such as the outer shell of protective bus duct, may also be detected by the ground fault detection system. It is also to be understood that the reset means 46 of the switch actuator 44 may be a mechanical reset or electrical reset means or it may be reset merely by disconnecting the switch actuator 44 from its source of electrical energy 60. In addition, it is to be understood that the switch actuator circuit with memory 44 may comprise a digital memory system or an analog memory system or a mechanical memory system or any combination of these. In addition, any and all of the functional sections, such as the sensor signal conditioner 36, the voltage comparator 38, the variable delay 40 and so on may be of the electromechanical variety or of the digital variety or of the analog variety or may comprise software means, such as punched tape, so that a digital computer may perform any or all of the functions described with respect to each of the functional blocks. It is also to be understood that the ground fault sensor such as 32' may be used with or actuated by other types of zero sequence phase detectors such as electrical networks or filters rather than the current transformer 30.

The apparatus embodying the teachings of this invention has several advantages. One of which is that the variable delay disabler or disabling means 68 used in combination with the switching means 66 enhances the response time of the ground fault sensor to a point where the circuit breaker 150 being controlled or actuated by the ground fault sensor may be caused to actuate each of its contacts to an open position within the time of approximately one cycle after a ground fault or similar current has been detector or sensed.

I claim as my invention:

1. Electrical protective apparatus for sensing the presence of a predetermined ground electrical current in a polyphase electrical transmission system and for actuating a circuit interrupter to open the contacts thereof which form part of said transmission system a predetermined time after said predetermined ground current has been sensed, comprising first means adapted to respond to a predetermined ground current in said system for normally producing an output signal to cause actuation of said circuit interrupter after substantially a predetermined time delay, a disabling means for actuating said first means to produce said output signal to cause actuation of said circuit interrupter substantially instantaneously and a connecting means for selectively connecting said disabling means to said first means or for operatively disconnecting said disabling means from said firs means.

2. A ground fault protective system adapted for use with a polyphase alternating current system comprising current transformer means for deriving an output current which varies with the ground current in said system, an input electrical circuit having an input connected to said current transformer means and having output terminals for producing a first output signal at said output terminals when said ground current exceeds a predetermined value, a time delay means having an input connected to said output terminals of said input circuit and output terminals for producing a second output signal at said output terminals after a predetermined time delay upon the occurrence of said first output signal, an output circuit having an input connected to the output terminals of said time delay means and output terminals for producing a third output in response to said second output signal, a delay disabler circuit having an input connected to said input electrical circuit and an output for producing an additional output signal when said input circuit produces said first output signal, and a selector switch having a plurality of positions connected between the output of said delay disabler circuit and said time delay means, said time delay means being actuable in one position of said switch by said additional output signal to actuate said output circuit substantially instantaneously upon the occurrence of said first output signal to actuate said output circuit to produce said third output.

3. The combination as claimed in claim 2 wherein said input electrical circuit comprises a sensor signal conditioner circuit and a voltage comparator circuit connected to said signal conditioner circuit said sensor signal conditioner circuit having an input connected to said current transformer means for receiving said output current from said current transformer means, said sensor signal conditioner circuit having an output terminal adapted to provide an output voltage signal which varies with the value of said output current, said output voltage signal being applied to said voltage comparator such that said voltage comparator is actuated to produce said first output signal when said output voltage of said sensor signal condition exceeds substantially a predetermined value corresponding to said predetermined value of ground current, said output circuit comprising a switch actuator circuit having an input connected to said time delay means and a switching circuit connected to said switch actuator circuit, said time delay means being adapted in a second position of said switch to provide said second output signal to trigger said switch actuator circuit to produce a switch actuating output signal after said predetermined time delay when said time delay means responds to said second output signal, aid switch actuating output signal actuating said switching circuit to produce said third output signal.

4. A ground fault protective system adapted for use with a polyphase alternating current system comprising a current transformer means for deriving an output current whose magnitude varies with the magnitude of ground current in said conductor system, an input electrical circuit having an input thereof connected to the output of said current transformer means and having output terminals for providing a first output signal when said ground current exceeds a predetermined value, wherein said input electrical circuit comprises a sensor signal conditioning circuit and a voltage comparator circuit connected to said signal conditioning circuit, said sensor signal conditioning circuit having an input connected to aid current transformer means for receiving said output current from said current transformer means, said sensor signal conditioning circuit having an output terminal adapted to provide an output voltage signal which varies with the value of said output current from said transformer means, said output voltage signal being applied to aid voltage comparator such that said voltage comparator is actuated to produce said first output signal when said output voltage of said sensor signal conditioning circuit exceeds substantially a predetermined value corresponding to said predetermined value of ground current, a time delay means having one set of input terminals thereof connected to said output terminals of said voltage comparator for producing a second output signal at the output terminals of said time delay means a predetermined time after the occurrence of said first output signal, an output circuit having an input connected to the output terminals of said time delay means and output terminals for producing a third output in response to said second output signal, said output circuit comprising a switch actuator circuit having an input thereof connected to said output terminal of said time delay means, said switch actuator circuit including a memory means, and a reset means connected to said memory means, and a switching circuit connected to the output of said switch actuator circuit, said time delay means being adapted to provide said second output signal to trigger said switch actuator circuit to produce a switch actuating output signal after said predetermined time delay when said time delay means responds to said second output signal, said switch actuating output signal said switching circuit to produce said third output signal, whereby after said switch actuator circuit has been triggered to produce said switch actuating output signal, said memory means causing said switch actuator circuit to continue to generate said switch actuating output signal until reset by said reset means, a delay disabler circuit having an input thereof connected to said input electrical circuit and an output for producing an additional output signal when said input circuit produces said first output signal, said time delay means having a second set of input terminals, a selector switch, having a plurality of positions, connected between said output of said delay disabler circuit and said second set of input terminals of said time delay means, said time delay means being actuable in one position of said selector switch by said additional output signal to actuate said switch actuator circuit in said output circuit substantially instantaneously upon the occurrence of said first output signal to thereby actuate said switching circuit of said output circuit to produce said third output signal.

5. The combination as claimed in claim 4 wherein said voltage comparator includes a first transistor having base, collector and emitter terminals, a first and second base resistor connected in series circuit relation with a junction terminal therebetween, a first and a second emitter resistor connected in series circuit relation with a junction terminal therebetween, said time delay means comprises a timing capacitor, said delay disabler comprises a second transistor having base, collector and emitter terminals, when said selector switch means is in said first position, said collector terminal of said second transistor is connected through said selector switch to said collector terminal of said first transistor and one side of said timing capacitor with the junction therebetween comprising the output terminal of said time delay means, the other side of said timing capacitor being connected to said emitter terminal of said first transistor and to one end of the series circuit which includes said first and second emitter resistors, said base terminal of said first transistor being connected to one end of the series circuit which includes said first and said second base resistors and also being connected in circuit relation with the said output terminal of the said sensor signal conditioner circuit, said base terminal of said second transistor being connected to said junction terminal between said first and said second base resistors, the emitter terminal of said second transistor being connected to said junction terminal between said first and said second emitter resistors, the other ends of said series circuit which includes said first and said second base resistors and the series circuit which includes said first and said second emitter resistors being connected, the application of said output voltage signal from said sensor signal conditioner concurrently to the base of said first transistor and to the end of the said series circuit which includes said first and second base resistors actuating said second transistor to be forward biased to an electrically conducting state from its collector terminal to its emitter terminal, the voltage at the junction formed by the collector terminal of said first transistor and one side of said capacitor being changed when said second transistor is actuated to a conducting state, this change in voltage comprising the output triggering signal of said time delay means.

* * * * *